(12) United States Patent
Cheng et al.

(10) Patent No.: US 12,025,868 B2
(45) Date of Patent: Jul. 2, 2024

(54) DISPLAY PANEL AND DISPLAY DEVICE

(71) Applicant: Wuhan China Star Optoelectronics Technology Co., Ltd., Hubei (CN)

(72) Inventors: Wei Cheng, Hubei (CN); Xindong Mei, Hubei (CN); Rui He, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,277

(22) PCT Filed: Dec. 15, 2021

(86) PCT No.: PCT/CN2021/138536
§ 371 (c)(1),
(2) Date: Dec. 28, 2021

(87) PCT Pub. No.: WO2023/102990
PCT Pub. Date: Jun. 15, 2023

(65) Prior Publication Data
US 2024/0036366 A1 Feb. 1, 2024

(30) Foreign Application Priority Data

Dec. 10, 2021 (CN) .......................... 202111506243.9

(51) Int. Cl.
*G02F 1/13* (2006.01)
*G02F 1/1334* (2006.01)
(Continued)

(52) U.S. Cl.
CPC ........ *G02F 1/1323* (2013.01); *G02F 1/13345* (2021.01); *G02F 1/133528* (2013.01);
(Continued)

(58) Field of Classification Search
CPC .............. G02F 1/1323; G02F 1/13345; G02F 1/133528; G02F 1/1339; G02F 1/134336; G02F 1/1347
See application file for complete search history.

(56) References Cited

U.S. PATENT DOCUMENTS 5,748,275 A * 5/1998 Sato ................... G02F 1/134336
349/144
2015/0062451 A1* 3/2015 Ono ..................... G06F 3/04166
349/12
(Continued)

FOREIGN PATENT DOCUMENTS

| CN | 104516614 | 4/2015 |
| CN | 106910765 | 6/2017 |

(Continued)

OTHER PUBLICATIONS

English Machine Translation of Fujissawa, TW 1736604 (Year: 2023).*

(Continued)

*Primary Examiner* — Donald L Raleigh (57) ABSTRACT

A display panel and a display device are provided. The display panel includes a dimming liquid crystal cell and a display liquid crystal cell. The dimming liquid crystal cell includes a first substrate, a second substrate, a dimming liquid crystal layer, a first electrode layer, and a second electrode layer. A first resistance reduction metal layer is disposed on the first substrate, and the first resistance reduction metal layer is electrically connected to the first electrode layer.

19 Claims, 4 Drawing Sheets

(51) Int. Cl.
  *G02F 1/1335* (2006.01)
  *G02F 1/1339* (2006.01)
  *G02F 1/1343* (2006.01)
  *G02F 1/1347* (2006.01)

(52) U.S. Cl.
  CPC ...... *G02F 1/1339* (2013.01); *G02F 1/134336* (2013.01); *G02F 1/1347* (2013.01)

(56) References Cited

U.S. PATENT DOCUMENTS

| | | | | |
|---|---|---|---|---|
| 2016/0291425 | A1* | 10/2016 | Ma | ............ G02F 1/134363 |
| 2016/0349555 | A1 | 12/2016 | Chang et al. | |
| 2017/0003535 | A1 | 1/2017 | Du | |
| 2022/0269116 | A1* | 8/2022 | Deng | ............ G02F 1/133531 |

FOREIGN PATENT DOCUMENTS

| | | | | |
|---|---|---|---|---|
| CN | 107624168 | | 1/2018 | |
| CN | 107632445 | | 1/2018 | |
| CN | 210428008 | | 4/2020 | |
| CN | 111552103 | | 8/2020 | |
| CN | 212255969 | | 12/2020 | |
| CN | 112198724 | | 1/2021 | |
| CN | 112230480 | | 1/2021 | |
| CN | 112230480 A * | | 1/2021 | ....... G02F 1/134309 |
| CN | 113433747 | | 9/2021 | |
| CN | 113552741 | | 10/2021 | |
| TW | I736604 B * | | 8/2021 | ............. G02F 1/137 |

OTHER PUBLICATIONS

English Machine Translation of Wu et al CN 112230480 (Year: 2024).*

International Search Report and the Written Opinion dated Aug. 25, 2022 From the International Searching Authority Re. Application No. PCT/CN2021/138536 and Its Translation Into English. (18 Pages).

Notification of Office Action and Search Report dated Dec. 8, 2022 From the State Intellectual Property Office of the People's Republic of China Re. Application No. 202111506243.9 and Its Translation Into English. (23 Pages).

* cited by examiner

DISPLAY PANEL AND DISPLAY DEVICE

RELATED APPLICATIONS

This application is a National Phase of PCT Patent Application No. PCT/CN2021/138536 having International filing date of Dec. 15, 2021, which claims the benefit of priority of Chinese Patent Application No. 202111506243.9 filed on Dec. 10, 2021. The contents of the above applications are all incorporated by reference as if fully set forth herein in their entirety.

FIELD AND BACKGROUND OF THE INVENTION

The application relates to a field of display technology, and in particular to a display panel and a display device.

When a special phase dimming liquid crystal cell for use in a switchable anti-peeping display is manufactured, polymer network liquid crystals in the dimming liquid crystal cell are oriented in a specific direction. When no external electric field is applied, the polymer network liquid crystals are tilted, and the polarized light of the display panel is phased in a direction of a large viewing angle, so that the light at the large viewing angle is intercepted by the upper polaroid to realize the narrow viewing angle display. In normal display, a voltage is applied to the polymer network liquid crystals to cause the polymer network liquid crystals oriented horizontally or vertically, and the viewing angle will not be affected at this time. Because there is a certain degree of haze for the polymer network liquid crystals in this mode, the viewing angle can be enlarged and uniformed, so that dynamic anti-peeping can be realized, and the wide and narrow viewing angle modes can be switched freely.

However, due to the enlargement of the size of the dimming liquid crystal cell, the resistance of the electrode layer on the substrate is too large, and the RC loading (resistance-capacitance loading) is large, resulting in that the voltages of the regions in the dimming liquid crystal cell farther from the voltage providing region cannot meet the tilt angles required for the polymer network liquid crystals. Moreover, inconsistent voltages in different regions can easily lead to uneven display of images under a side viewing angle, which causes light leakage in a large viewing angle and affects the anti-peeping effect.

SUMMARY OF THE INVENTION

The embodiments of the present disclosure provide a display panel and a display device to solve the technical problem in uneven display and poor anti-peeping effect of the existing display panels and display devices which is caused by inconsistent voltages in different regions due to excessively large resistance of the electrode layer of the dimming liquid crystal cell.

The present disclosure provides a display panel comprising a dimming liquid crystal cell and a display liquid crystal cell disposed on one side of the display liquid crystal cell. The dimming liquid crystal cell comprises a first substrate, a second substrate disposed on one side of the first substrate away from the display liquid crystal cell, a dimming liquid crystal layer disposed between the first substrate and the second substrate, and a first electrode layer disposed on one side of the first substrate facing the second substrate. The dimming liquid crystal layer includes a polymer network and a plurality of liquid crystal molecules distributed in the polymer network. The first electrode layer is connected to a first voltage signal. A first resistance reduction metal layer is disposed on the first substrate. The first resistance reduction metal layer is electrically connected to the first electrode layer.

Optionally, the first electrode layer comprises a plurality of sub-electrode portions arranged in an array. The first resistance reduction metal layer comprises a plurality of sub-metal portions. The plurality of sub-metal portions are connected to the plurality of sub-electrode portions in a one-to-one pattern. Each of the plurality of sub-metal portions is connected to the different first voltage signal.

Optionally, the different first voltage signals connected to the plurality of sub-metal portions are alternately positive and negative in sequence.

Optionally, the first electrode layer and the first resistance reduction metal layer are disposed in different layers. A first insulation layer is disposed between the first electrode layer and the first resistance reduction metal layer. The first resistance reduction metal layer is electrically connected to the first electrode layer by passing through a via of the first insulation layer.

Optionally, an orthographic projection of the first resistance reduction metal layer on the first substrate is located at an edge of an orthographic projection of the first electrode layer on the first substrate.

Optionally, a material of the first resistance reduction metal layer comprises one or a combination of molybdenum, aluminum, silver, copper, and molybdenum/aluminum/molybdenum.

Optionally, the dimming liquid crystal cell further comprises a second electrode layer and a second resistance reduction metal layer. The second electrode layer is disposed on one side of the second substrate facing the first substrate, the second electrode layer being connected to a second voltage signal. The second resistance reduction metal layer is disposed on the second substrate. The second resistance reduction metal layer is electrically connected to the second electrode layer.

Optionally, the first voltage signal is a driving voltage signal, the second voltage signal is a common voltage signal.

Optionally, a sealant layer is further disposed between the first substrate and the second substrate. A golden ball is disposed in the sealant layer. The first electrode layer is electrically connected to the second electrode layer through the golden ball.

The present disclosure also provides a display panel comprising a dimming liquid crystal cell and a display liquid crystal cell disposed on one side of the display liquid crystal cell. The dimming liquid crystal cell comprises a first substrate, a second substrate disposed on one side of the first substrate away from the display liquid crystal cell, a dimming liquid crystal layer disposed between the first substrate and the second substrate, and a first electrode layer disposed on one side of the first substrate facing the second substrate. The dimming liquid crystal layer includes a polymer network and a plurality of liquid crystal molecules distributed in the polymer network. The first electrode layer is connected to a first voltage signal. A first resistance reduction metal layer is disposed on the first substrate.

Optionally, the first electrode layer comprises a plurality of sub-electrode portions arranged in an array. The first resistance reduction metal layer comprises a plurality of sub-metal portions. The plurality of sub-metal portions are connected to the plurality of sub-electrode portions in a one-to-one pattern. Each of the plurality of sub-metal portions is connected to the different first voltage signal.

Optionally, the different first voltage signals connected to the plurality of sub-metal portions are alternately positive and negative in sequence.

Optionally, the first electrode layer and the first resistance reduction metal layer are disposed in different layers. A first insulation layer is disposed between the first electrode layer and the first resistance reduction metal layer. The first resistance reduction metal layer is electrically connected to the first electrode layer by passing through a via of the first insulation layer.

Optionally, an orthographic projection of the first resistance reduction metal layer on the first substrate is located at an edge of an orthographic projection of the first electrode layer on the first substrate.

Optionally, a material of the first resistance reduction metal layer comprises one or a combination of molybdenum, aluminum, silver, copper, and molybdenum/aluminum/molybdenum.

Optionally, the dimming liquid crystal cell further comprises a second electrode layer and a second resistance reduction metal layer. The second electrode layer is disposed on one side of the second substrate facing the first substrate, the second electrode layer being connected to a second voltage signal. The second resistance reduction metal layer is disposed on the second substrate. The second resistance reduction metal layer is electrically connected to the second electrode layer.

Optionally, the first voltage signal is a driving voltage signal, the second voltage signal is a common voltage signal.

Optionally, a sealant layer is further disposed between the first substrate and the second substrate. A golden ball is disposed in the sealant layer. The first electrode layer is electrically connected to the second electrode layer through the golden ball.

The present disclosure provides a display device comprising a display panel. The display panel comprises a dimming liquid crystal cell and a display liquid crystal cell disposed on one side of the display liquid crystal cell. The dimming liquid crystal cell comprises a first substrate, a second substrate disposed on one side of the first substrate away from the display liquid crystal cell, a dimming liquid crystal layer disposed between the first substrate and the second substrate, and a first electrode layer disposed on one side of the first substrate facing the second substrate. The dimming liquid crystal layer includes a polymer network and a plurality of liquid crystal molecules distributed in the polymer network. The first electrode layer is connected to a first voltage signal. A first resistance reduction metal layer is disposed on the first substrate.

In the display panel and the display device provided by the present disclosure, the first resistance reduction metal layer is disposed on the first substrate. The first resistance reduction metal layer is electrically connected to the first electrode layer. Since the resistance of the first resistance reduction metal layer is less, the disposition of the first resistance reduction metal layer effectively reduces the impedance which is induced during the transmission of the first voltage signal, so that the voltages in the different regions are consistent, which is conducive to achieving the uniformity of driving power-up and the uniform display of images. In addition, the voltages of the regions in the dimming liquid crystal cell farther from the voltage providing region can also meet the required tilt angles of the liquid crystal molecules in the polymer network, which is conducive to obtaining a stable anti-peeping viewing angle.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

REFERENCE CHARACTER

100: Dimming liquid crystal cell; 200: Display liquid crystal cell; 11: First substrate; 12: Second substrate 12; 13: Dimming liquid crystal layer; 14: First electrode layer; 15: Second electrode layer; 16: First resistance reduction metal layer; 161: Sub-metal portion; 17: Second resistance reduction metal layer; 18: First insulation layer; 181: First via; 19: Second insulation layer; 191: Second via; 20: Sealant layer; 201: Golden ball 201; 21: First polarizer; 22: Second polarizer.

DESCRIPTION OF SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Figure 1:
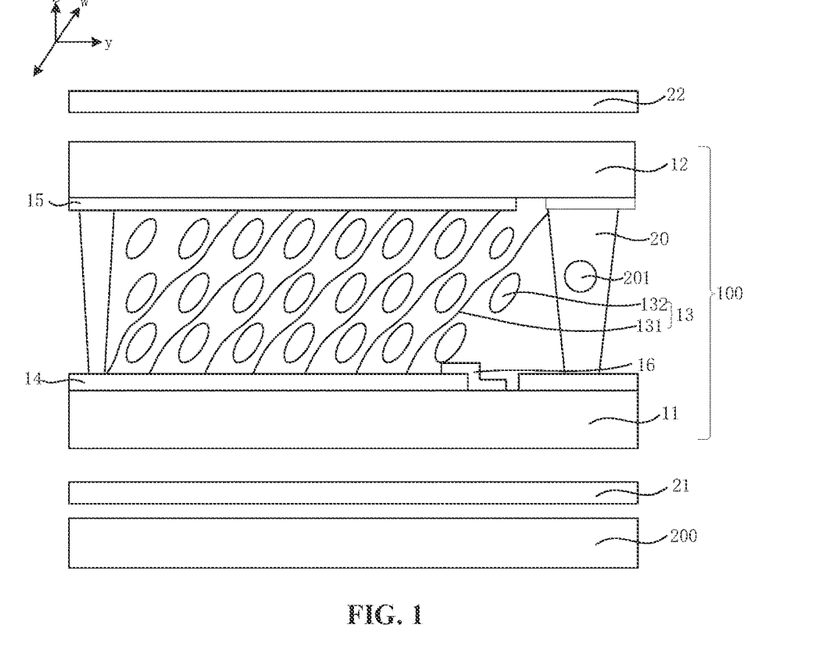
FIG. 1 is a schematic diagram of a cross-sectional structure of a first display panel according to an embodiment of the present disclosure.
Figure 2:
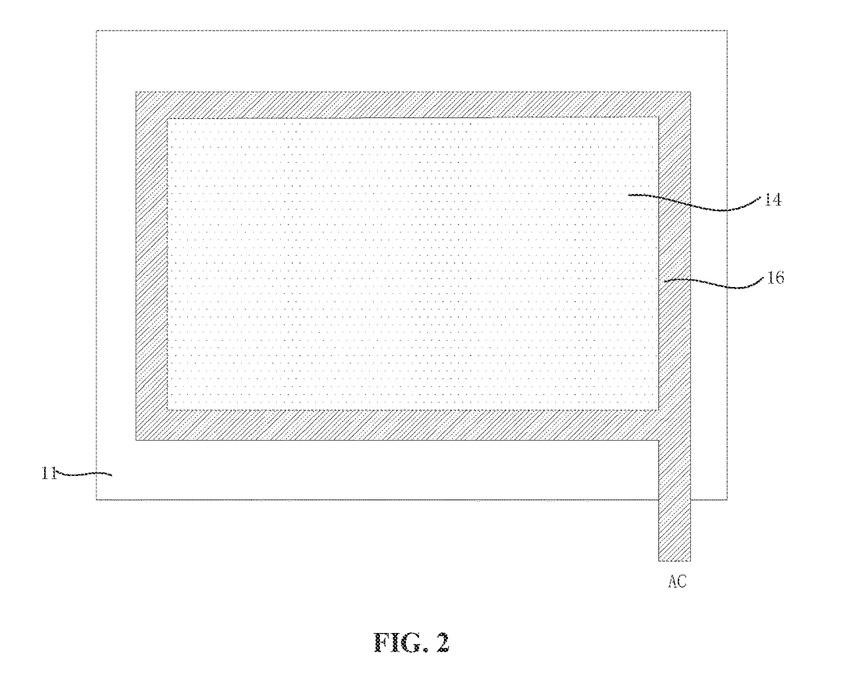
FIG. 2 is a schematic diagram of a cross-sectional structure of a first substrate according to an embodiment of the present disclosure.

Please refer to FIG. 1 and FIG. 2. FIG. 1 is a schematic diagram of a cross-sectional structure of a first display panel according to an embodiment of the present disclosure. FIG. 2 is a schematic diagram of a cross-sectional structure of a first substrate according to an embodiment of the present disclosure. The display panel of the embodiment of the present disclosure comprises a dimming liquid crystal cell 100 and a display liquid crystal cell 200. The dimming liquid crystal cell 100 is disposed on one side of the display liquid crystal cell 200. The light emitted by the display liquid crystal cell 200 is modulated by the dimming liquid crystal cell 100 to achieve the free switching between a wide viewing angle mode and a narrow viewing angle mode.

The dimming liquid crystal cell 100 comprises a first substrate 11, a second substrate 12, a dimming liquid crystal layer 13, a first electrode layer 14, and a first resistance reduction metal layer 16. The first substrate 11 and the second substrate 12 are disposed opposite to each other. The second substrate 12 is disposed on the side of the first substrate 11 away from the display liquid crystal cell 200. The dimming liquid crystal layer 13 is disposed between the first substrate 11 and the second substrate 12. The dimming liquid crystal layer 13 comprises a polymer network 131, a plurality of liquid crystal molecules 132 distributed in the polymer network 131. The liquid crystal molecules 132 are nematic liquid crystal molecules. The first electrode layer 14 is disposed on the side of the first substrate 11 facing the second substrate 12. The first electrode layer 14 is connected to a first voltage signal.

In the present disclosure, a first resistance reduction metal layer 16 is disposed on the first substrate 11. The first resistance reduction metal layer 16 is electrically connected to the first electrode layer 14. Since the resistance of the first resistance reduction metal layer 16 is less, the first resistance reduction metal layer 16 and the first electrode layer 14 are connected to effectively reduce the impedance which is induced during the transmission of the first voltage signal, so that the voltages in the different regions of the first substrate 11 are consistent, which is conducive to achieving the uniformity of driving power-up and making the display of images uniform. In addition, the voltages of the regions in the dimming liquid crystal cell 100 farther from the voltage providing region can also meet the required tilt angles of the liquid crystal molecules 132 in the polymer network, so that the anti-peeping viewing angle is stable.

The first substrate 11 may be a substrate close to the display liquid crystal cell 200, and the second substrate 12 may be a substrate far away from the display liquid crystal cell 200. In this case, the first voltage signal connected to the first substrate 11 is a driving voltage signal, and the second voltage signal connected to the second substrate 12 is a common voltage signal. Alternatively, the first substrate 11 may be a substrate far away from the display liquid crystal cell 200, and the second substrate 12 may be a substrate close to the display liquid crystal cell 200. In this case, the first voltage signal connected to the first substrate 11 is a common voltage signal, and the second voltage signal connected to the second substrate 12 is a driving voltage signal.

The dimming liquid crystal cell 100 also comprises a second electrode layer 15, which is disposed on the side of the second substrate 12 facing the first substrate 11. The second electrode layer 15 is connected to a second voltage signal. The liquid crystal molecules 132 are deflected under the action of the electric field formed by the first voltage signal and the second voltage signal to make the tilt angles to meet the requirements, thereby modulating the light emitted from the display liquid crystal cell 200 to achieve the free switching between the wide viewing angle mode and the narrow viewing angle mode. Similarly, the resistance and capacitance loading of the second electrode layer 15 causes the voltages of the regions of the second substrate 12 farther from the voltage providing region to fail to meet the required tilt angles of the liquid crystal molecules 132, which easily leads to uneven display of the images under a side viewing angle.

Figure 3:
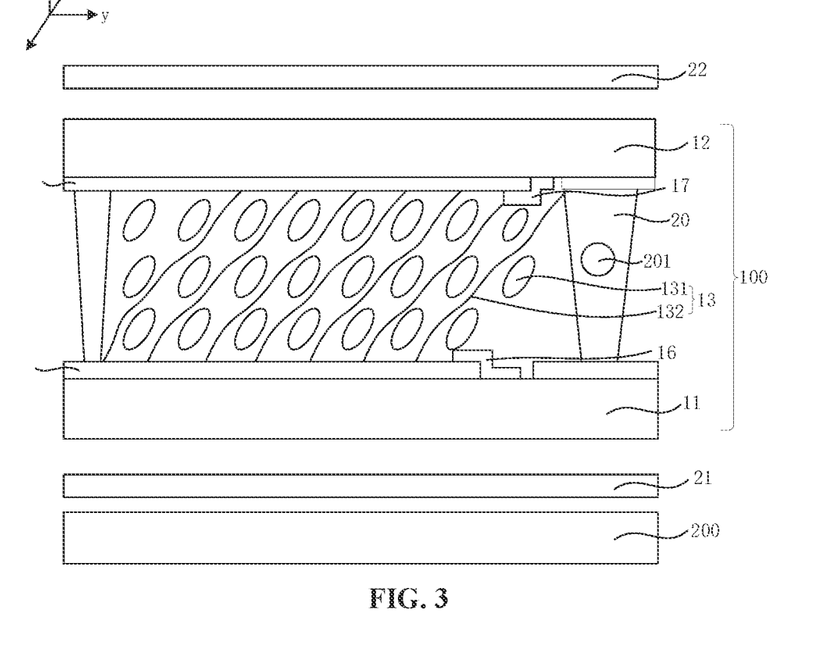
FIG. 3 is a schematic diagram of a cross-sectional structure of a second display panel according to an embodiment of the present disclosure.
Figure 4:
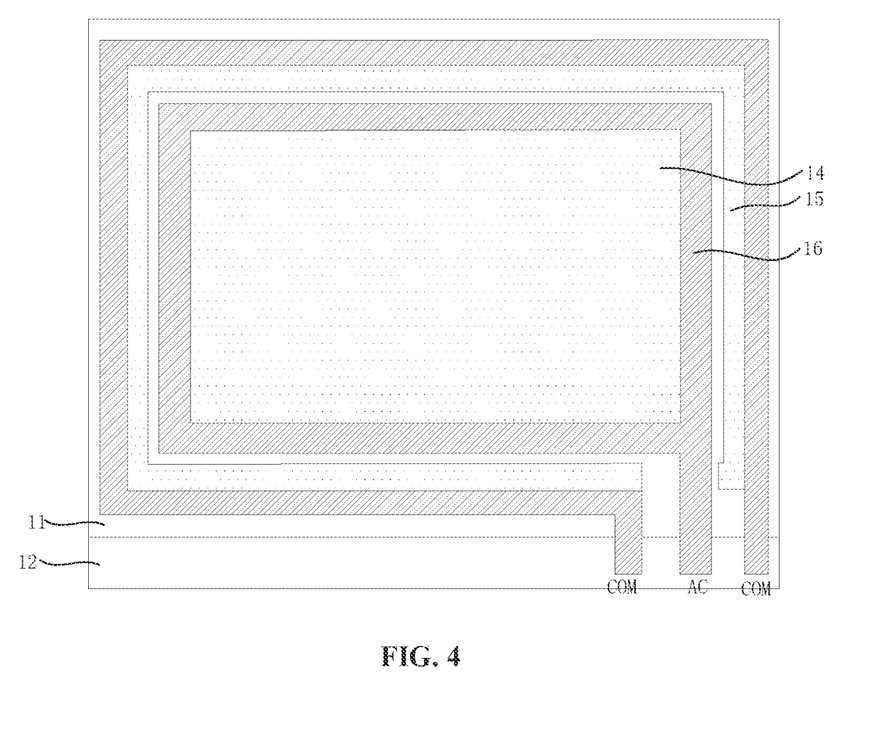
FIG. 4 is a schematic diagram of a first top-view structure of a dimming liquid crystal cell according to an embodiment of the present disclosure.

Please refer to FIG. 3 and FIG. 4. FIG. 3 is a schematic diagram of a cross-sectional structure of a second display panel according to an embodiment of the present disclosure. FIG. 4 is a schematic diagram of a first top-view structure of a dimming liquid crystal cell according to an embodiment of the present disclosure. In the embodiment of the present disclosure, a resistance reduction metal layer may also be disposed on the second substrate 12, that is, a second resistance reduction metal layer 17 is disposed on the second substrate 12. The second resistance reduction metal layer 17 is electrically connected to the second electrode layer 15. Since the resistance of the second resistance reduction metal layer 17 is less, the second resistance reduction metal layer 17 and the second electrode layer 15 are connected to effectively reduce the impedance which is induced during the transmission of the second voltage signal, so that the voltages in the different regions of the second substrate 12 are consistent, which is conducive to achieving the uniformity of driving power-up and making the display of images uniform. In addition, the voltages of the regions in the dimming liquid crystal cell 100 farther from the voltage providing region can further meet the required tilt angles of the liquid crystal molecules 132 in the polymer network, so that the anti-peeping viewing angle is stable.

In order to clearly explain the technical solution of the present disclosure, the embodiment of the present disclosure will be described by, for example, taking the first voltage signal connected to the first substrate 11 as a driving voltage signal and the second voltage signal connected to the second substrate 12 as a common voltage signal.

The driving voltage signal AC is an AC voltage signal. The common voltage signal COM is a DC voltage signal.

Figure 5:
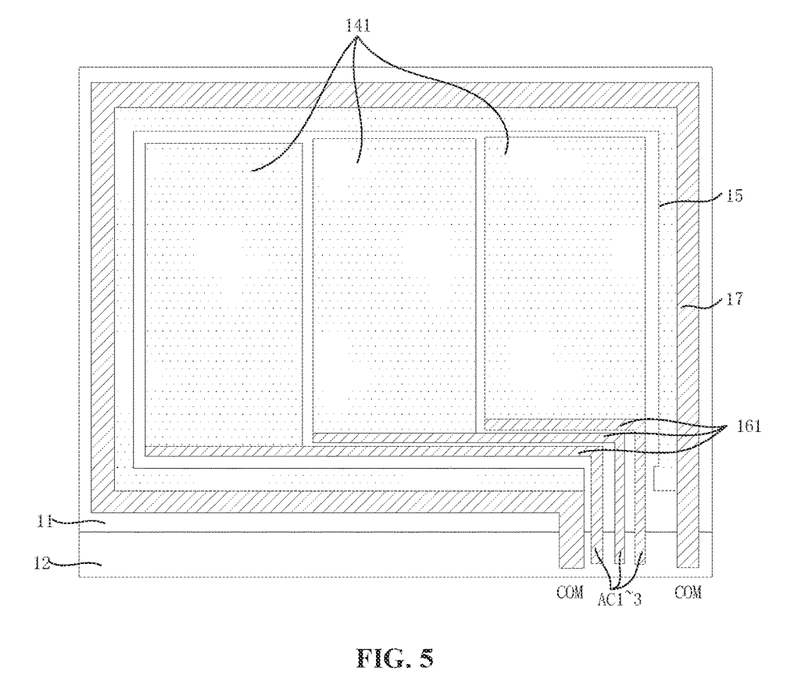
FIG. 5 is a schematic diagram of a second top-view structure of a dimming liquid crystal cell according to an embodiment of the present disclosure.
Figure 6:
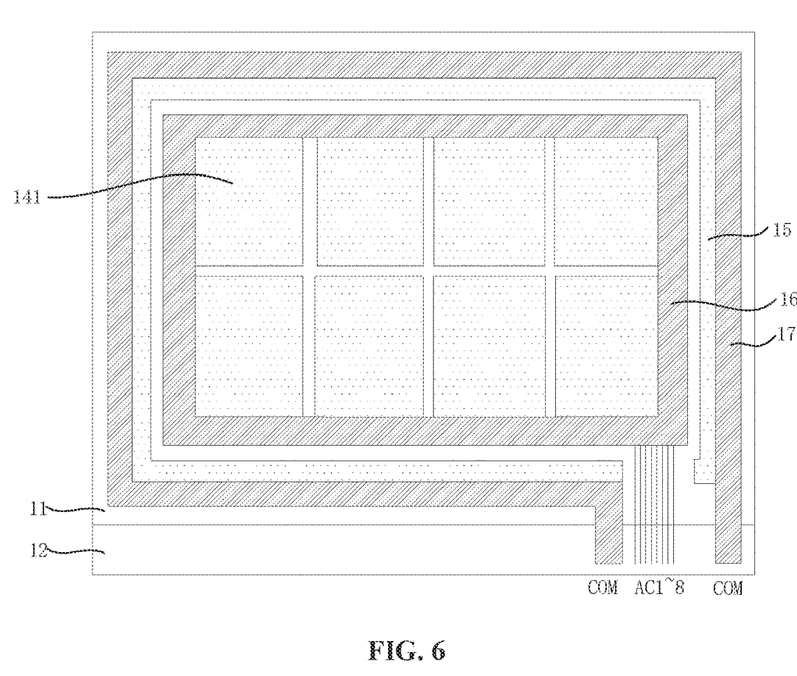
FIG. 6 is a schematic diagram of a third top-view structure of a dimming liquid crystal cell according to an embodiment of the present disclosure.

Please refer to FIG. 5 and FIG. 6. FIG. 5 is a schematic diagram of a second top-view structure of a dimming liquid crystal cell according to an embodiment of the present disclosure. FIG. 6 is a schematic diagram of a third top-view structure of a dimming liquid crystal cell according to an embodiment of the present disclosure. The first electrode layer 14 comprises a plurality of sub-electrode portions 141 arranged in an array. The first resistance reduction metal layer 16 comprises a plurality of sub-metal portions 161. The plurality of sub-metal portions 161 are connected to the plurality of sub-electrode portions 141 in a one-to-one pattern. Wherein, each sub-metal portion 161 is connected to the different first voltage signal. By designing the first electrode layer 14 to be partitioned, the arrangement of the sub-metal portions 161 can reduce the resistance of the corresponding sub-electrode portions 141, so that the resistance of each sub-electrode portion 141 is reduced, thereby further reducing the entire resistance of the first electrode layer 14, and the voltage of different areas of the first substrate 11 can be adjusted more finely.

The embodiment of the present disclosure does not limit the number of sub-electrode portions 141. For example, in FIG. 5, the first electrode layer 14 comprises three sub-electrode portions 141 arranged in sequence. The three sub-electrode portions 141 are sequentially connected to the first voltage signals AC1~3 from left to right. T sub-metal portions 161 are disposed at the voltage terminals of the corresponding sub-electrode portions 141 close to the first voltage signals AC1~3. For another example, in FIG. 6, the first electrode layer 14 comprises eight sub-electrode portions 141 arranged in an array. The eight sub-electrode portions 141 are arranged in 2 rows and 4 columns. The eight sub-electrode portions 141 are sequentially connected to the first voltage signals AC1~8. Wherein, the four sub-electrode portions 141 located in the first row are sequentially connected to the first voltage signals AC1~4 from left to right, the four sub-electrode portions 141 located in the second row are sequentially connected to the first voltage signals AC5-8 from left to right. Wherein, the first resistance reduction metal layer is disposed around the first electrode layer 14, each sub-metal portion 161 is disposed on the edge of the corresponding sub-electrode portion 141.

Further, the different first voltage signals AC connected to the plurality of sub-metal portions 161 are alternately positive and negative in sequence, which can avoid vibration and howling phenomenon caused by the inverse piezoelectric effect of large capacitance. For example, the first voltage signals AC1~4 are driven in a +/−/+/− pattern, the first voltage signals AC5~8 are driven in a +/−/+/− pattern.

The areas of the sub-electrode portions 141 may be set to be equal or set to ne unequal, and the specific adjustment should be made according to the impedance of each region, which is not limited in the embodiment of the present disclosure.

The arrangement of the plurality of sub-electrode portions 141 should also be adjusted according to the impedance of each region, which is not limited in the embodiment of the present disclosure.

The second electrode layer 15 can also adopt a partition design to further reduce the entire resistance of the second electrode layer 15. The details are referred to the above description of the partition design of the first electrode layer 14, which will not be repeated here.

The first electrode layer 14 and the first resistance reduction metal layer 16 are disposed in different layers. A first insulation layer 18 is disposed between the first electrode layer 14 and the first resistance reduction metal layer 16. The first resistance reduction metal layer 16 is electrically connected to the first electrode layer 14 by passing through the first via 181 of the first insulation layer 18. Optionally, the first insulation layer 18 covers the first electrode layer 14, the first resistance reduction metal layer 16 is disposed on the side of the first insulation layer 18 away from the first substrate 11. In another embodiment, the first insulation layer 18 covers the first resistance reduction metal layer 16, the first electrode layer 14 is disposed on the side of the first insulation layer 18 away from the first substrate 11.

Similarly, the second electrode layer 15 and the second resistance reduction metal layer 17 are disposed in different layers. A second insulation layer 19 is disposed between the second electrode layer 15 and the second resistance reduction metal layer 17. The second resistance reduction metal layer 17 is electrically connected to the second electrode layer 15 by passing through the second via 191 of the second insulation layer 19. Optionally, the second insulation layer 19 covers the second electrode layer 15, the second resistance reduction metal layer 17 is disposed on the side of the second insulation layer 19 away from the second substrate 12. In another embodiment, the second insulation layer 19 covers the second resistance reduction metal layer 17, the second electrode layer 15 is disposed on the side of the second insulation layer 19 away from the second substrate 12.

The first insulation layer 18 and the second insulation layer 19 may be organic insulation materials or inorganic insulation materials.

The first resistance reduction metal layer 16 can be directly connected to the first electrode layer 14, and the second resistance reduction metal layer 17 can be directly connected to the second electrode layer 15, which saves the first insulation layer 18 and the second insulation layer. This is beneficial to reduce the thickness of the dimming liquid crystal cell 100, thereby reducing the thickness of the display panel.

The orthographic projection of the first resistance reduction metal layer 16 on the first substrate 11 is located at the edge of the orthographic projection of the first electrode layer 14 on the first substrate 11, so that the arrangement of the first resistance reduction metal layer 16 has a small effect on the aperture ratio of the first electrode layer 14.

The orthographic projection of the second resistance reduction metal layer 17 on the second substrate 12 is located at the edge of the orthographic projection of the second electrode layer 15 on the second substrate 12, so that the arrangement of the second resistance reduction metal layer 17 has an effect on the aperture ratio of the second electrode layer 15.

Referring to FIG. 2 and FIG. 4, the first resistance reduction metal layer 16 is disposed around the first electrode layer 14, the second resistance reduction metal layer 17 is disposed around the second electrode layer 15. In the embodiment of the present disclosure, the first resistance reduction metal layer 16 and the second resistance reduction metal layer 17 are respectively disposed around the first electrode layer 14 and the second electrode layer 15, so as to avoid the problem from the interference patterns which exist after the assembly of the display liquid crystal cell 200 and the dimming liquid crystal cell 100 is completed. This is beneficial to improve the image-displaying effect of the display panel.

In other embodiments, the first resistance reduction metal layer 16 and the second resistance reduction metal layer 17 may take other shapes. For example, the first resistance reduction metal layer 16 and the second resistance reduction metal layer 17 may be patterned over the entire surfaces (such as thin lines).

The first resistance reduction metal layer 16 is arranged in a circle, the second resistance reduction metal layer 17 is arranged in a circle. However, it should be noted that the application does not limit the specific number of turns of the first resistance reduction metal layer 16 and the second resistance reduction metal layer 17. The specific number should be determined according to actual conditions.

The first resistance reduction metal layer 16 and the second resistance reduction metal layer 17 are formed of other materials with better electrical conductivity, and their resistivities are both smaller than the resistivities of the first electrode layer 14 and the second electrode layer 15.

Optionally, the materials of the first resistance reduction metal layer 16 and the second resistance reduction metal layer 17 comprise one or a combination of molybdenum, aluminum, silver, copper, and molybdenum/aluminum/molybdenum.

Optionally, the materials of the first electrode layer 14 and the second electrode layer 15 comprise indium tin oxide (ITO).

Referring to FIG. 1 and FIG. 5, a sealant layer 20 is further disposed between the first substrate 11 and the second substrate 12. A golden ball 201 is disposed in the sealant layer 20. The first electrode layer 14 is electrically connected to the second electrode layer 15 through the golden ball 201, so as to lead the second electrode layer 15 from the second substrate 12 to the first substrate 11, so as to achieve the design of the pins on the same side, which results in that the first voltage signal and the second voltage signal are connected to only one side of the first substrate 11, which is beneficial to simplify the structure.

Referring to FIG. 1 and FIG. 3, the display panel further comprises a first polarizer 21 and a second polarizer 22. The first polarizer 21 is disposed between the display liquid crystal cell 200 and the dimming liquid crystal cell 100. The second polarizer 22 is disposed on the side of the dimming liquid crystal cell 100 away from the first polarizer 21. The direction of the optical axis of the first polarizer 21 is parallel to the direction of the optical axis of the second polarizer 22. The polymer network is arranged along a first direction w. The first direction w is tilted relative to the normal line of the first polarizer 21. In the first mode, the long axes of the liquid crystal molecules 132 are arranged along the first direction w. In the second mode, the long axes of the liquid crystal molecules 132 are arranged along a second direction. The second direction is different from the first direction w. The viewing angle of the display panel in the first mode is smaller than the viewing angle of the display panel in the second mode.

Please refer to FIG. 1 and FIG. 3, the dimming liquid crystal cell 100 may be disposed above the display liquid crystal cell 200.

Figure 7:
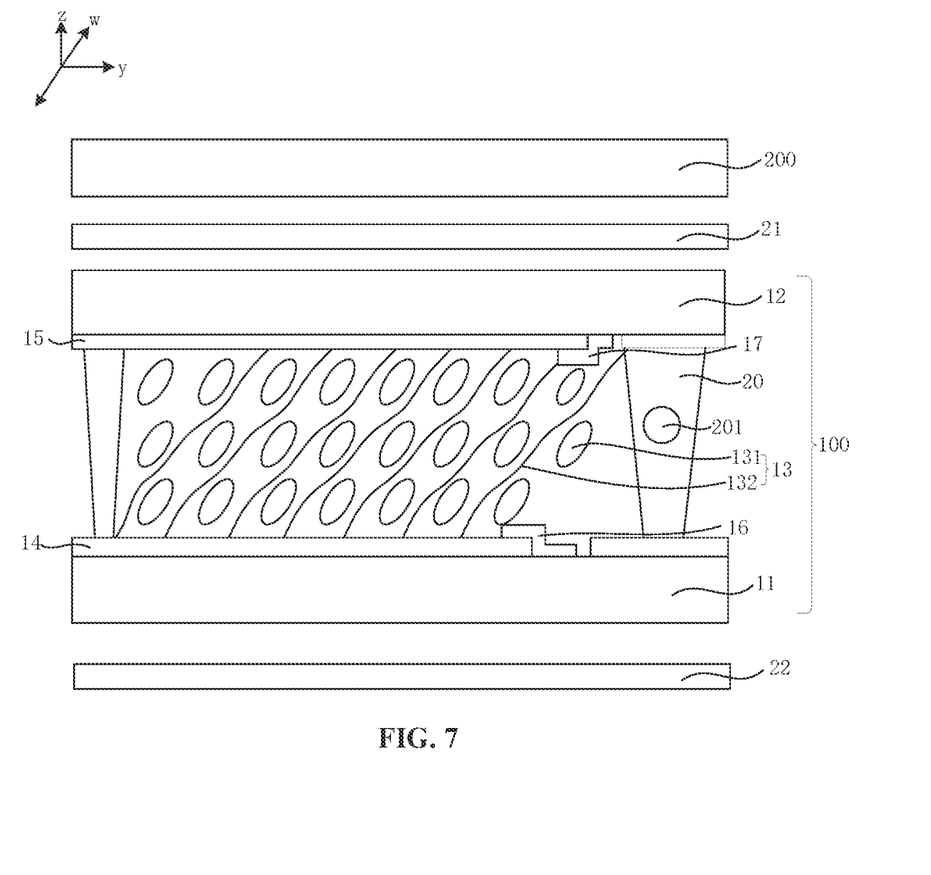
FIG. 7 is a schematic cross-sectional structure diagram of a third display panel according to an embodiment of the present disclosure.

Please refer to FIG. 7. FIG. 7 is a schematic cross-sectional structure diagram of a third display panel according to an embodiment of the present disclosure. The dimming liquid crystal cell 100 may be arranged under the display liquid crystal cell 200. In the embodiment of the present disclosure, the first mode of the display panel may be an anti-peeping display mode, the second mode of the display panel may be a normal display mode. Moreover, the dimming liquid crystal layer 13 is used to cause the first light incident along the normal direction z of the first polarizer 21 to pass through the second polarizer 22 in the first mode and cause the second light incident and tilted relative to the normal direction z of the first polarizer 21 to be blocked or partially blocked by the second polarizer 22. In the second mode, the long axes of the liquid crystal molecules 132 are different from the first direction w, so that more light can pass through the second polarizer 22 to increase the viewing angle range of the display panel in the second mode. Thus. The viewing angle of the display panel in the second mode is greater than the viewing angle of the display panel in the first mode.

In the embodiment of the present disclosure, the polymer network in the dimming liquid crystal layer 13 is arranged to be tilted relative to the normal direction z of the first polarizer 21, thereby providing an orientation effect to the liquid crystal molecules 132. Thus, the long axes of the liquid crystal molecules 132 are also tilted relative to the normal direction z of the first polarizer. Due to the light deflection characteristics of the liquid crystal molecules 132, the first light incident along the normal direction z of the first polarizer 21 can pass through the second polarizer 22, and the second light incident and tilted relative to the normal direction z of the first polarizer 21 can be blocked or partially blocked by the second polarizer 22. The display panel provided by the embodiments of the present disclosure can selectively transmit light under different viewing angles, and thus can provide an anti-peeping effect at a specific viewing angle. The display panel provided in the present disclosure can also be switched between the anti-peeping display and the normal display to enhance the applicability of the display panel.

Further, the dimming liquid crystal cell 100 further comprises a first alignment film (not shown in the figures) and a second alignment film (not shown in the figures) for aligning the liquid crystal molecules 132. The first alignment film is disposed on the side of the first electrode layer 14 away from the first substrate 11. The second alignment film is disposed on the side of the second electrode layer 15 away from the second substrate 12.

In summary, the application has been disclosed as above in preferred embodiments. However, the above-mentioned preferred embodiments are not intended to limit the application. Those having ordinary skill in the art can make various changes and modifications without departing from the spirit and scope of the application. Such changes and modifications. Therefore, the protection scope of the application is subject to the scope defined by the claims.

What is claimed is:

1. A display panel comprising a dimming liquid crystal cell and a display liquid crystal cell disposed on one side of the display dimming liquid crystal cell, the dimming liquid crystal cell comprising:
    a first substrate;
    a second substrate disposed on one side of the first substrate away from the display liquid crystal cell;
    a dimming liquid crystal layer disposed between the first substrate and the second substrate, the dimming liquid crystal layer comprising a polymer network and a plurality of liquid crystal molecules distributed in the polymer network; and
    a first electrode layer disposed on one side of the first substrate facing the second substrate, the first electrode layer being connected to a first voltage signal,
    wherein a first resistance reduction metal layer is disposed on the first substrate, the first resistance reduction metal layer is electrically connected to the first electrode layer, the first resistance reduction metal layer is disposed around the first electrode layer.

2. The display panel of claim 1, wherein the first electrode layer comprises a plurality of sub-electrode portions arranged in an array, the first resistance reduction metal layer comprises a plurality of sub-metal portions, the plurality of sub-metal portions are connected to the plurality of sub-electrode portions in a one-to-one pattern; wherein each of the plurality of sub-metal portions is connected to the different first voltage signal.

3. The display panel of claim 2, wherein the different first voltage signals connected to the plurality of sub-metal portions are alternately positive and negative in sequence.

4. The display panel of claim 1, wherein the first electrode layer and the first resistance reduction metal layer are disposed in different layers, a first insulation layer is disposed between the first electrode layer and the first resistance reduction metal layer, the first resistance reduction metal layer is electrically connected to the first electrode layer by passing through a via of the first insulation layer.

5. The display panel of claim 1, wherein an orthographic projection of the first resistance reduction metal layer on the first substrate is located at an edge of an orthographic projection of the first electrode layer on the first substrate.

6. The display panel of claim 1, wherein a material of the first resistance reduction metal layer comprises one or a combination of molybdenum, aluminum, silver, copper, and molybdenum/aluminum/molybdenum.

7. The display panel of claim 1, wherein the dimming liquid crystal cell further comprises:
    a second electrode layer disposed on one side of the second substrate facing the first substrate, the second electrode layer being connected to a second voltage signal;

a second resistance reduction metal layer disposed on the second substrate, the second resistance reduction metal layer being electrically connected to the second electrode layer.

8. The display panel of claim 7, wherein the first voltage signal is a driving voltage signal, the second voltage signal is a common voltage signal.

9. The display panel of claim 7, wherein a sealant layer is further disposed between the first substrate and the second substrate, a golden ball is disposed in the sealant layer, the first electrode layer is electrically connected to the second electrode layer through the golden ball.

10. A display panel comprising a dimming liquid crystal cell and a display liquid crystal cell disposed on one side of dimming display liquid crystal cell, the dimming liquid crystal cell comprising:
a first substrate;
a second substrate disposed on one side of the first substrate away from the display liquid crystal cell;
a dimming liquid crystal layer disposed between the first substrate and the second substrate, the dimming liquid crystal layer comprising a polymer network and a plurality of liquid crystal molecules distributed in the polymer network; and
a first electrode layer disposed on one side of the first substrate facing the second substrate, the first electrode layer being connected to a first voltage signal,
wherein a first resistance reduction metal layer is disposed on the first substrate, and the first resistance reduction metal layer is electrically connected to the first electrode layer,
wherein the first electrode layer comprises a plurality of sub-electrode portions arranged in an array, the first resistance reduction metal layer comprises a plurality of sub-metal portions, the plurality of sub-metal portions are connected to the plurality of sub-electrode portions in a one-to-one pattern; wherein each of the plurality of sub-metal portions is connected to the different first voltage signal.

11. The display panel of claim 10, wherein the different first voltage signals connected to the plurality of sub-metal portions are alternately positive and negative in sequence.

12. The display panel of claim 10, wherein the first electrode layer and the first resistance reduction metal layer are disposed in different layers, a first insulation layer is disposed between the first electrode layer and the first resistance reduction metal layer, the first resistance reduction metal layer is electrically connected to the first electrode layer by passing through a via of the first insulation layer.

13. The display panel of claim 10, wherein an orthographic projection of the first resistance reduction metal layer on the first substrate is located at an edge of an orthographic projection of the first electrode layer on the first substrate.

14. The display panel of claim 10, wherein a material of the first resistance reduction metal layer comprises one or a combination of molybdenum, aluminum, silver, copper, and molybdenum/aluminum/molybdenum.

15. The display panel of claim 10, wherein the dimming liquid crystal cell further comprises:
a second electrode layer disposed on one side of the second substrate facing the first substrate, the second electrode layer being connected to a second voltage signal;
a second resistance reduction metal layer disposed on the second substrate, the second resistance reduction metal layer being electrically connected to the second electrode layer.

16. The display panel of claim 15, wherein the first voltage signal is a driving voltage signal, the second voltage signal is a common voltage signal.

17. The display panel of claim 15, wherein a sealant layer is further disposed between the first substrate and the second substrate, a golden ball is disposed in the sealant layer, the first electrode layer is electrically connected to the second electrode layer through the golden ball.

18. The display panel of claim 10, further comprising:
a first polarizer disposed between the display liquid crystal cell and the dimming liquid crystal cell; and
a second polarizer disposed on one side of the dimming liquid crystal cell away from the first polarizer,
wherein the polymer network is arranged along a first direction, the first direction is tilted relative to a normal line of the first polarizer; in a first mode, long axes of the plurality of liquid crystal molecules are arranged along the first direction; in a second mode, the long axes of the plurality of liquid crystal molecules are arranged along a second direction, the second direction is different from the first direction, and a viewing angle of the display panel in the first mode is smaller than a viewing angle of the display panel in the second mode.

19. A display device comprising a display panel, the display panel comprising a dimming liquid crystal cell and a display liquid crystal cell disposed on one side of the display dimming liquid crystal cell, the dimming liquid crystal cell comprising:
a first substrate;
a second substrate disposed on one side of the first substrate away from the display liquid crystal cell;
a dimming liquid crystal layer disposed between the first substrate and the second substrate, the dimming liquid crystal layer comprising a polymer network and a plurality of liquid crystal molecules distributed in the polymer network; and
a first electrode layer disposed on one side of the first substrate facing the second substrate, the first electrode layer being connected to a first voltage signal,
wherein a first resistance reduction metal layer is disposed on the first substrate, and the first resistance reduction metal layer is electrically connected to the first electrode layer, the first resistance reduction metal layer is disposed around the first electrode layer.

* * * * *